Patented July 17, 1951

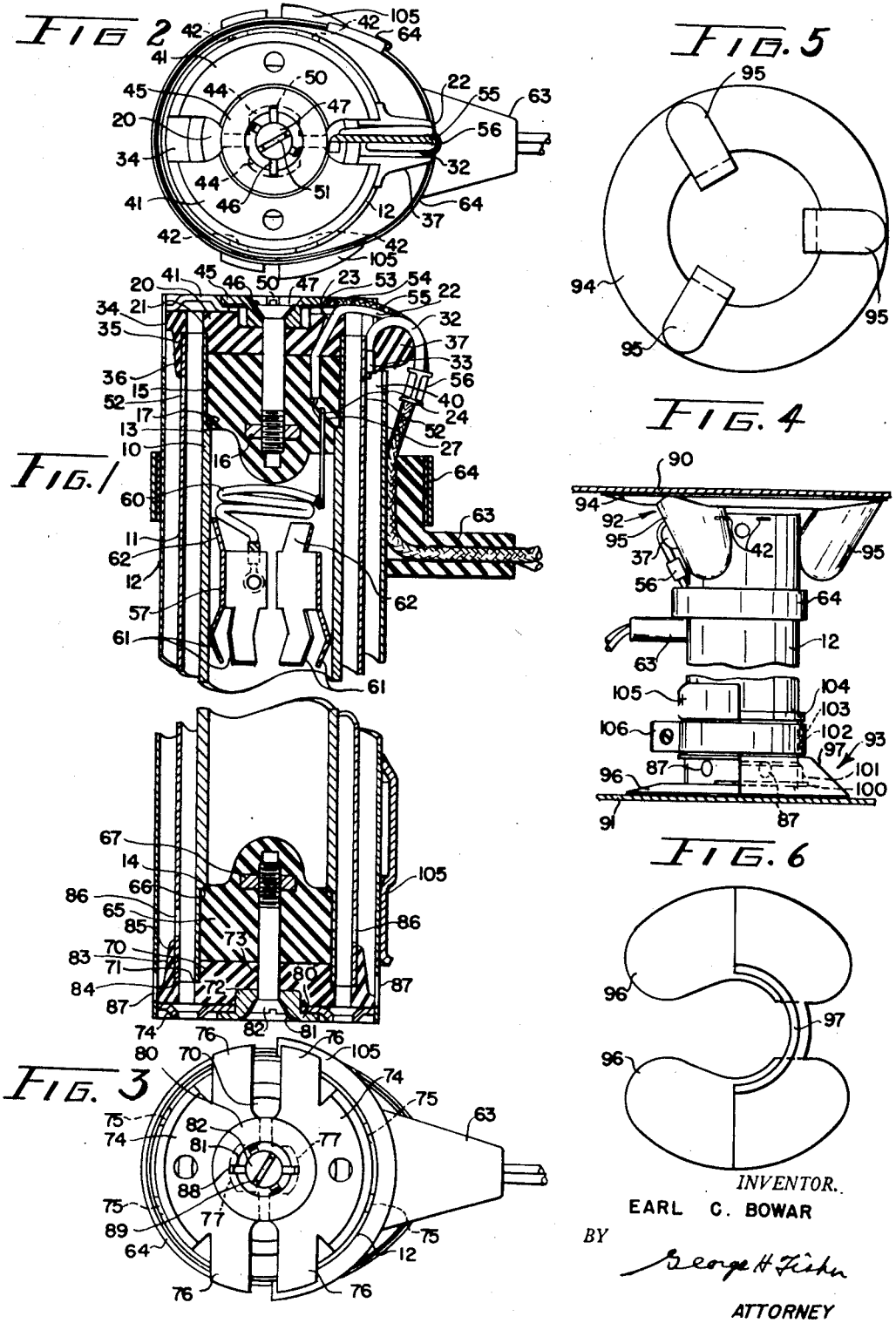

2,560,757

UNITED STATES PATENT OFFICE 2,560,757

TANK UNIT

Earl C. Bowar, Minneapolis, Minn., assignor to Minneapolis-Honeywell Regulator Company, Minneapolis, Minn., a corporation of Delaware Application September 12, 1949, Serial No. 115,287

15 Claims. (Cl. 175—41.5)

This invention is concerned with the capacitance type of liquid level measuring devices and more particularly with the capacitance type of integral tank unit for measuring the amount of fuel in an airplane fuel tank.

Tank units for measuring the fuel in fuel tanks have long been known in the art with the tank units which measure the fuel level by means of change in capacitance due to change in fuel level being now considered as the most accurate and trouble-free method of measurement. Capacitance type tank units using flat electrodes and using cylindrical electrodes are both known with the units having electrodes of cylindrical construction being deemed preferable in that they are more compact, may be conveniently shielded from physical blows by placing a cylindrical shield about the electrodes and are almost completely free from the edge effects found in capacitors in which the electrodes are not continuous.

Capacitance tank units which are mounted from either the top or the bottom of the tank are now in common use. This type of unit, however, was not satisfactory for use in tanks such as the wing tanks of small planes wherein the metal sheet forming the wing itself forms the top and bottom walls of the tank. This type of fuel tank is known as an integral tank. It is an object of this invention to provide a capacitance type fuel gage tank unit suitable for mounting within an integral tank, the cylindrical elements being carried by members adapted to be suitably secured to top and bottom surfaces of the tank.

Because the height of fuel tanks will vary slightly from plane to plane of the same type it is desirable to have a small tolerance in the mounting of the tank unit. It is therefore another object of this invention to provide a mounting for an integral tank unit which will firmly hold the unit in a tank but still allow for some variation from normal tank height.

The cylindrical capacitance plates should extend into close proximity with the top and bottom tank surfaces in order to sense fuel level in these regions. On the other hand fuel and air must be able to enter and leave the space between the plates. Hence, the mounting means must be provided with openings for this purpose. It is therefore another object of the invention to provide upper and lower mounting means for the condenser plates having provision for free passage of fuel and air to the space therebetween.

It is, of course, necessary to the obtaining of accurate indications of the fuel level that the electrodes be carefully aligned with respect to each other and that is, therefore, one of the objects of this invention. This object is accompanied by means aligning each end of each electrode with respect to the shield, thus in turn aligning the electrodes with respect to each other.

When the tank wall is part of the wing surface it is impossible to bring the electrical conductors from the electrodes in the tank unit out through the top or bottom of the tank so the conductors must be brought through the fuel and out the side of the tank. If the conductors were to be taken out through the side of the tank unit it would mean a hole would have to be made in the outer electrode. This would result in the change in capacitance not being linear with change in the fuel level. It is therefore desirable to bring the conductors out past the ends of the electrodes. The connections should be to the inside of the inner electrode and to the outside of the outer electrode in order that the distance between the two electrodes always be the same. The connections should be free from any stress which might result from a pull on the conductors. It is therefore another object of the invention to provide a type of connection to the the inner electrode which may be easily made and offers no impediment to the assembling of the tank unit. Another object of the invention is to design a tank unit in which the stress is removed from the connections between the electrodes and conductors.

The manner of obtaining these and other objects and advantages is more fully disclosed in the following detailed description taken in conjunction with the accompanying drawings in which:

Figure 1 is a cross-section of a gage unit for integral tanks embodying various features of the invention;

Figure 2 is a top view of the tank unit;

Figure 3 is a bottom view of the tank unit;

Figure 4 shows the tank unit held in the top and bottom mountings;

Figure 5 is a bottom view of the top mounting; and

Figure 6 is a top view of the bottom mounting.

In the tank unit shown in Figure 1, an inner cylindrical electrode 10 is centered within an outer cylindrical electrode 11 about which is placed a cylindrical shield 12. The portions of the electrodes 10 and 11 that come in contact with the fuel preferably are coated with an electrical insulating material. The inner electrode 10 has a shoulder 13 on its inner surface near the upper end and a second shoulder 14 on the inner surface near the lower end for purposes presently to be described. A plug 15 formed of a resilient insulating material and having a nut 16 embedded therein is fitted into the upper end of the inner electrode 10 so that a shoulder 17 on the plug fits against shoulder 13 in the inner electrode. A second resilient plug 20 having a shoulder 21 is fitted over the end of plug 15 with the shoulder 21 resting against the upper end of electrode 10. If so desired plugs 15 and 20 could be molded as a single plug.

A conductor 22 passes through an aperture 23 in plug 20 to a soldered connection 24 with a pin 27 which is molded into plug 15. An electrical conductor 32 is soldered to the outer electrode 11 at connection 33.

An annular ring 34 formed of a resilient insulating material fits between the outer electrode 11 and the shield 12 with a shoulder 35 resting over the end of the outer electrode 11. The ring has an annular tongue 36 which extends downwardly along the outside of outer electrode 11 to provide a long electrical surface leakage path between the outer electrode and the shield. One portion of the ring extends outwardly in a rounded portion 37. The conductors 22 and 32 are brought out of the tank unit over this rounded portion which extends outwardly through a cutaway portion 40 in the shield.

A pair of similar segmentally shaped plates 41, which may be seen better in Figure 2, are placed over the ends of the electrodes and over plug 20 and ring 34. Plates 41 each have a pair of extensions 42 which fit into apertures in the shield adjacent its upper extremity and hold plugs 15 and 20 firmly within the inner electrode. The plates 41 each have a non-circular cutaway portion 44 at the center into which is placed a washer 45 having a portion shaped to engage the cutaway portions 44 of the plates 41 and so cannot rotate with respect thereto. The washer 45 is adapted to hold the arcuate edges of the plates 41 in engagement with the inner surface of shield 12 with the extensions 42 extending into the apertures in the shield. Above the washer 45 is placed a six fingered lock washer 46. Two of the oppositely extending fingers of washer 46 are pressed down into groove 50 provided in washer 45 for that purpose.

A screw or bolt 47 having a slotted head passes through the six fingered washer, the washer 45, through the plug 20 and is threaded into the nut 16 which is molded into resilient plug 15. Two of the oppositely extending fingers on lock washer 46 are bent forward into the groove 51 in the head of bolt 47. The six fingered lock washer 46 is held with respect to washer 45 by means of the two fingers of washer 46 being inserted into grooves 50 of washer 45, the bolt 47 being held fixed with respect to the fingered washer 46, so that the bolt 47 is locked with respect to the washer 45 and plates 41 and cannot be loosened due to vibration. Since any opposed pair of fingers of lock washer 46 can be bent to engage the slot in the head of bolt 47 and any other pair can be bent to engage the washer 45 the screw can be tightened the desired amount and locked in that position. Tightening the bolt 47 draws the nut 16 toward the plates 41, but since upper resilient plug 20 is in engagement with the plates 41 the result is lateral expansion of the plug 15 to firmly engage the inner surface of the inner electrode 10 to form a fluid tight seal therewith and to unite the parts mechanically.

Several holes 52 are provided at the upper end of outer electrode 11 to permit air to pass back and forth to the space between the two electrodes. The passage thus provided supplements the passage area provided between the plates 41 and around the electrical connections.

A conducting ring 53 is placed underneath washer 45 and is soldered as at 54 to a conductor 55 which has its other end fastened to clamp 56. Clamp 56 connects conductor 55 to a coaxial cover braided on either conductor 22 or conductor 32, the coaxial cover being suitably grounded outside the tank.

Electrical connection to the inner electrode 10 is made by a spring member 57 which is connected to a pin 27 by means of a conductor 60. The spring member 57 is formed from a metal strip which has outwardly and then inwardly extending fingers 61 at one end of the member. The other end of the spring member has a plurality of outwardly extending fingers 62. In assembling the unit the central portion of the member is squeezed sufficiently to get the spring fingers within the inner electrode. When the spring member is released the fingers tend to dig into the inner electrode to hold the spring member in position and to make a good electrical connection with the electrode.

The two conductors 22 and 32 are shown to be clamped to the unit by being passed through a resilient member 63 which is clamped by means of clamp 64 to the shield 12.

At the bottom end of the inner electrode 10 a plug 65 of resilient insulating material having a shoulder 66 is inserted so that shoulder 66 will butt against shoulder 14 at the lower end of the inner electrode. Plug 65 has a nut 67 embedded therein. A second plug 70 having a shoulder 71 is inserted into the inner electrode behind the plug 65 until shoulder 71 butts against the end of the inner electrode 10. Plug 70 is dished out as at 72 on the side away from the inner electrode. The plug 70 also has a central aperture 73 for purposes presently to be described. If so desired plugs 65 and 70 could be molded as a single plug.

A pair of segmentally shaped plates 74, better seen in Figure 3, are fitted over the end of plug 70. Each plate 74 has two extensions 75 near the center of their arcuate portions which are inserted into apertures in the shield 12 near the bottom edge thereof and hold plugs 65 and 70 firmly within the inner electrode. At the end of each flat side of the plate is an extension 76 that engages the bottom edge of the shield 12. The shield is suitably notched to receive these extensions. At the center of each flat side of the plate 74 is a non-circular cut-out portion 77. A washer 80 engages the cut-out portions of both plates 74 and is prevented thereby from turning. Two of the oppositely extending fingers of a lock washer 81, similar to the previously described lock washer 46, are forced down into groove 88 in the washer 80 provided for that purpose to prevent the washer 81 from rotating. A bolt 82 is passed through washers 80 and 81 and through the hole 73 in plug 70 and is threaded into nut 67 in plug 65. When the bolt has been tightened in nut 67, two of the outwardly extending fingers of washer 81 are pressed down into the groove 89 in the top of the bolt to prevent the bolt from turning and becoming loose.

An annular ring 83 of resilient insulating material having a shoulder 84 is inserted between the outer electrode 11 and the shield 12 with the shoulder 84 resting against the bottom end of the outer electrode 11. The ring 83 has an annular tongue 85 extending upwardly along the outer surface of outer electrode 11 to provide a long electrical surface leakage path between the outer electrode and the shield.

It can thus be seen that by means of the annular rings 34 and 83 the outer electrode 11 is aligned with respect to the shield 12. It can also be seen that by means of plugs 15 and 65, plugs 20 and 70, plates 41 and 74, and washers 45 and 80, the inner electrode is aligned with respect to the shield. With both the inner electrode and the outer electrode aligned with respect to the shield the two electrodes are aligned with respect to each other.

Several drainage holes 86 are provided near the bottom end of the outer electrode 11 to permit the fuel to rise and fall between the two electrodes. These holes supplement passages provided through each of the plates 76 and through the area between them to assure agreement between the liquid level in the tank and in the space between the electrodes.

Drainage holes 87 are provided also near the bottom edge of the shield 12 to permit fuel to flow between the outer electrode and the shield.

In Figure 4 the tank unit is shown mounted, by means of an upper mount 92 and a lower mount 93, in a tank having an upper wall 90 and a lower wall 91. The mounts may be cemented to the surfaces of the tank.

The upper mount is further shown in Figure 5 and is seen to comprise a flat base 94 and three downwardly and inwardly extending fingers 95, all molded of a flexible insulating material. The upper end of the tank unit is inserted between these fingers and is held snugly by these fingers whether the tank unit abuts against the flat surface 94 or is slightly spaced therefrom.

The bottom mount is shown in a top view of Figure 6 and is seen to comprise a base divided into two parts 96 each covering about a third of the circumference of the circle. On the base 96 is a superstructure 97 which joins the two parts 96 together. The mount may be molded in one piece of insulating material.

The superstructure is half round in shape and along the inside surface at the bottom has a groove 100 of a diameter equal to that of extensions 76 on the bottom plates 74 of the tank unit. Above this groove 100 is an inner surface 101 having a diameter greater than the diameter of the shield 12 but less than the diameter of the groove 100. This portion of the superstructure fits over the drainage holes 87 and permits the fuel to flow in and out of the drainage holes which are otherwise covered by the superstructure. Above the surface 101 is a second surface 102 which has a diameter equal to the diameter of shield 12. This portion of the superstructure fits snugly against the shield. Along the outer surface of the superstructure 97 at the portion corresponding to the inner surface 102 is surface 103 which is parallel to surface 102 and thus to shield 12 when the tank unit is inserted into the mount. At the upper end of the superstructure is an outwardly extending lip 104.

The tank unit has a half round metallic member 105 near the bottom of the shield at a height from the bottom of the tank unit corresponding to the height of outer surface 103 from the base 96 of the lower mount 93.

When the tank unit is inserted into the mount 93, the ends of the half-round member 105 meet with the ends of the half-round portion of the superstructure 97 of mount 93 so that the outer surface of member 105 meets with the outer surface 103 of the superstructure. A clamp 106 is placed about member 105 and surface 103 to hold the tank unit in the mount.

It is thus seen that the tank unit will be firmly anchored in the bottom mount 93 while its upper end is secured against lateral movement by the resilient fingers 95, which nevertheless allow for some variation in the relative heights of the gage unit and the tank.

Though the above detailed description discloses a preferred embodiment of the invention it is to be understood that I wish to be limited only to the extent of the appended claims.

I claim as my invention:

1. A capacitance type of liquid level measuring device comprising: a first cylindrical electrode; a second cylindrical electrode about said first electrode; a cylindrical shield about said second electrode; a first resilient member within a first end of said first electrode, said member having a nut embedded therein with a hole extending to said nut; a first annular plate over the end of said resilient member and said first electrode and fixedly positioned with respect to said shield; a first bolt passing through said plate and the hole in said member and threaded into said nut to fixedly position said first electrode with respect to said shield; a second resilient member within a second end of said first electrode, said second member having a nut embedded therein with a hole extending to said nut; a second annular plate over the end of said second resilient member and said first electrode and fixedly positioned with respect to said shield; a second bolt passing through said second plate and the hole in said second member and threaded into the nut in said second member to fixedly position said first electrode with respect to said shield; a first annular resilient ring compressed between said second electrode and said shield at one end thereof and fixedly positioning said second electrode with respect to said shield and thus with respect to said first electrode; and a second annular resilient ring compressed between said second electrode and said shield at the other end thereof and fixedly positioning said second electrode with respect to said shield and thus with respect to said first electrode.

2. A capacitance type of liquid level measuring device comprising: a first cylindrical electrode; a second cylindrical electrode about said first electrode; a cylindrical shield about said second electrode; a resilient member having a nut imbedded therein and a hole extending to said nut within said first electrode; a plate fixed to said member by means of a bolt threaded into said nut; said plate being fixed to said shield and positioning said first electrode with respect to said shield; and an annular member between said second electrode and said shield to position said second electrode with respect to said shield and thus with respect to said first electrode.

3. A capacitance type of liquid level measuring device comprising: a first cylindrical electrode; a second cylindrical electrode about said first electrode and substantially coextensive therewith; a spring member of conducting material fitting snugly within said first electrode and making contact therewith; a resilient insulating member within said first electrode and in engagement therewith, said resilient member having a conducting member molded therein; means electrically connecting said spring member to said conducting member; an electrical connection to said conducting member and extending from said electrodes; and means positioning said electrodes with respect to each other.

4. A capacitance type of liquid level measuring device comprising: a first cylindrical electrode; a second cylindrical electrode about said first electrode; a cylindrical shield about said second electrode; a spring-fingered member of conducting material within said first electrode and making contact therewith; a conducting pin; an electrical conductor; means connecting said electrical conductor and said pin; a resilient insulating member containing the connection between said conductor and said pin molded therein and also having a nut molded therein with a hole extending to said nut, said resilient member fitted snugly within said first electrode; means connecting said spring-fingered member with said pin; an annular plate over the end of said resilient member and said first electrode and fixedly positioned with respect to said shield; a bolt passing through said plate and the hole in said resilient member and threaded into said nut to fixedly position said first electrode with respect to said shield; a second electrical conductor; a second connection between said conductor and the second electrode, and an annular resilient ring compressed between said second electrode and said shield and fixedly positioning said second electrode with respect to said shield and thus with respect to said first electrode, said ring also compressing the second conductor against the second electrode to remove stress on the second connection between the conductor and second electrode.

5. A capacitance type of liquid level measuring device comprising: a first cylindrical electrode; a second cylindrical electrode about said first electrode; a cylindrical shield about said second electrode; a spring-fingered member of conducting material within said first electrode and making contact therewith; a conducting pin; an electrical conductor; means connecting said electrical conductor and said pin; a first resilient member having the connection between said conductor and said pin molded therein and also having a nut molded therein with a hole extending to said nut, said resilient member fitted snugly within one end of said first electrode; means connecting said spring-fingered member with said pin; an annular plate over the end of said resilient member and said first electrode and fixedly positioned with respect to said shield; a bolt passing through said plate and the hole in said resilient member and threaded into said nut to fixedly position said first electrode with respect to said shield; a second resilient member within a second end of said first electrode, said second member having a nut embedded therein with a hole extending to said nut; a second annular plate over the end of said second resilient member and said first electrode and fixedly positioned with respect to said shield; a second bolt passing through said second plate and the hole in said second member and threaded into the nut in said second member to fixedly position said first electrode with respect to said shield; a first annular resilient ring compressed between said second electrode and said shield at one end thereof and fixedly positioning said second electrode with respect to said shield and thus with respect to said first electrode; and a second annular resilient ring compressed between said second electrode and said shield at the other end thereof and fixedly positioning said second electrode with respect to said shield and thus with respect to said first electrode.

6. A mounting for a cylindrical device having drainage holes in and around the bottom comprising: a resilient member having a plurality of extensions equidistant from a given point for insertion therebetween of a cylindrical device; a second resilient member having a flat annular ring with a portion of the circumference cut away for a base, and a half-round superstructure with a portion of the inner surface having a radius greater than that of the cylindrical device mounted in the mount to permit drainage of liquid through the holes around the bottom of the device and a further portion of the superstructure having an inner radius equal to that of the cylindrical device so that it fits snugly against said device; and a clamp to clamp said further portion of the superstructure to said device to hold them firmly together.

7. A mounting for a cylindrical device having drainage holes in and around the bottom and air holes around the top comprising: a resilient member having a base plate and a plurality of extensions on said base plate equidistant from a point on said base plate for the insertion of a cylindrical device between said extensions, said extensions extending downwardly and inwardly; a second resilient member having a split base and a half-round superstructure connecting the portions of said base, a portion of said superstructure having an inside diameter greater than the diameter of the cylindrical device mounted in the mount to permit drainage of liquid through the holes around the bottom of the device and a further portion of the superstructure having an inside diameter equal to that of the cylindrical device; and means to clamp the cylindrical device to said further portion of the superstructure.

8. A cylindrical device and a mounting for comprising: a first cylinder; a second cylinder about said first cylinder; a third cylinder about said second cylinder; a resilient member in said first cylinder; a plate fixed with respect to said third cylinder and said resilient member positioning said first cylinder with respect to said third cylinder; an annular member between said second cylinder and said third cylinder to position said second cylinder with respect to said third cylinder and thus with respect to said first cylinder; a resilient mounting member having a base plate and plurality of extensions on said base plate equidistant from a point on said base plate for the insertion of one end of said cylindrical device between said extensions; a second resilient mounting member having a split base and a half-round superstructure connection the portions of said base, a portion of the superstructure having an inside diameter equal to that of the cylindrical device; and means to clamp the second end of the cylindrical device to said portion of the superstructure.

9. A capacitance type of liquid level measuring device and a mounting therefor comprising: a first cylindrical electrode; a second cylindrical electrode about said first electrode; a cylindrical shield about said second electrode; a first resilient member within a first end of said first electrode, said member having a nut embedded therein with a hole extending to said nut; a first annular plate over the end of said resilient member and said first electrode and fixedly positioned with respect to said shield; a first bolt passing through said plate and the hole in said member and threaded into said nut to fixedly position said first electrode with respect to said shield; a second resilient member within a second end of said first electrode, said second member having a nut embedded therein with a hole extending to said nut; a second annular plate over the end of said second resilient member and said first electrode and fixedly positioned with respect to said shield; a second bolt passing through said second plate and the hole in said second member and threaded into the nut in said second member to fixedly position said first electrode with respect to said shield; a first annular resilient ring compressed between said second electrode and said shield at one end thereof and fixedly positioning said second electrode with respect to said shield and thus with respect to said first electrode; a second annular resilient ring compressed between said second electrode and said shield at the other end thereof and fixedly positioning said second electrode with respect to said shield and thus with respect to said first electrode; a resilient mounting member having a base plate and a plurality of extensions on said base plate equidistant from a point on said base plate for the insertion of one end of said cylindrical device between said extensions; a second resilient mounting member having a split base and a half-round superstructure connecting the portions of said base, a portion of the superstructure having an inside diameter equal to that of the cylindrical device; and means to clamp the second end of the cylindrical device to said portion of the superstructure.

10. A capacitance type of liquid level measuring device and a mounting therefore comprising: a first cylindrical electrode; a second cylindrical electrode about said first electrode; a cylindrical shield about said second electrode; a spring-fingered member of conducting material within said first electrode and making contact therewith; an electrical conductor; a conducting pin; means connecting said electrical conductor and said pin; a first resilient member having the connection between said conductor and said pin molded therein and also having a nut molded therein with a hole extending to said nut, said resilient member fitted snugly within one end of said first electrode; means connecting said spring-fingered member with said pin; an annular plate over the end of said resilient member and said first electrode and fixedly positioned with respect to said shield; a bolt passing through said plate and the hole in said resilient member and threaded into said nut to fixedly position said first electrode with respect to said shield; a second resilient member within a second end of said first electrode, said second member having a nut molded therein with a hole extending to said nut; a second annular plate over the end of said second resilient member and said first electrode and fixedly positioned with respect to said shield; a second bolt passing through said second plate and the hole in said second member and threaded into the nut in said second member to fixedly position said first electrode with respect to said shield; a first annular resilient ring compressed between said second electrode and said shield at one end thereof and fixedly positioning said second electrode with respect to said shield and thus with respect to said first electrode; a second annular resilient ring compressed between said second electrode and said shield at the other end thereof and fixedly positioning said second electrode with respect to said shield and thus with respect to said first electrode; a resilient mounting member having a base plate and a plurality of extensions on said base plate equidistant from a point on said base plate for the insertion of one end of said cylindrical device between said extensions; a second resilient mounting member having a split base and a half-round superstructure connecting the portions of said base, a portion of the superstructure having an inside diameter equal to that of the cylindrical device; and means to clamp the second end of the cylindrical device to said portion of the superstructure.

11. A capacitance type of liquid level measuring device having drainage holes in and around the bottom and air holes around the top and a mounting therefore comprising: a first cylindrical electrode; a second cylindrical electrode about said first electrode; a cylindrical shield about said second electrode; a spring-fingered member of conducting material within said first electrode and making contact therewith; a conducting pin; an electrical conductor; means connecting said electrical conductor and said pin; a first resilient member having the connection between said conductor and said pin molded therein and also having a nut molded therein with a hole extending to said nut, said resilient member fitted snugly within one end of said first electrode; means connecting said spring-fingered member with said pin; an annular plate over the end of said resilient member and said first electrode and fixedly positioned with respect to said shield; a bolt passing through said plate and the hole in said resilient member and threaded into said nut to fixedly position said first electrode with respect to said shield; a second resilient member within a second end of said first electrode, said second member having a nut molded therein with a hole extending to said nut; a second annular plate over the end of said second resilient member and said first electrode and fixedly positioned with respect to said shield; a second bolt passing through said second plate and the hole in said second member and threaded into the nut in said second member to fixedly position said first electrode with respect to said shield; a first annular resilient ring compressed between said second electrode and said shield at one end thereof and fixedly positioning said second electrode with respect to said shield and thus with respect to said first electrode; a second annular resilient ring compressed between said second electrode and said shield at the other end thereof and fixedly positioning said second electrode with respect to said shield and thus with respect to said first electrode; a resilient mounting member having a base plate and a plurality of extensions on said base plate equidistant from a point on said base plate for the insertion of one end of said cylindrical device between said extensions, said extensions extending downwardly and inwardly; a second resilient mounting member having a split base and a half-round superstructure connecting the portions of said base, a portion of the superstructure having an inside diameter equal to that of the cylindrical device; and means to clamp the second end of the cylindrical device to said portion of the superstructure.

12. A capacitance type of liquid level measuring device having drainage holes in and around the bottom and air holes around the top and a mounting therefore comprising: a first cylindrical electrode; a second cylindrical electrode about said first electrode; a cylindrical shield about said second electrode; a spring-fingered member of conducting material within said first electrode and making contact therewith; a conducting pin; an electrical conductor; means connecting said electrical conductor and said pin; a first resilient member having the connection between said conductor and said pin molded therein and also having a nut molded therein with a hole extending to said nut, said resilient member fitted snugly within one end of said first electrode; means connecting said spring-fingered member with said pin; an annular plate over the end of said resilient member and said first electrode and fixedly positioned with respect to said shield; a bolt passing through said plate and the hole in said resilient member and threaded into said nut to fixedly position said first electrode with respect to said shield; a second resilient member within a second end of said first electrode, said second member having a nut molded therein with a hole extending to said nut; a second annular plate over the end of said second member and said first electrode and fixedly positioned with respect to said shield; a second bolt passing through said second plate and the hole in said second member and threaded into the nut in said second member to fixedly position said first electrode with respect to said shield; a second electrical conductor; a connection between said second electrical conductor and said second electrode; a first annular resilient ring compressed between said second electrode and said shield at one end thereof and fixedly positioning said second electrode with respect to said shield and thus with respect to said first electrode, said ring also compressing the conductor against the second electrode to remove stress on the connection between the conductor and second electrode; a second annular resilient ring compressed between said second electrode and said shield at the other end thereof and fixedly positioning said second electrode with respect to said shield and thus with respect to said first electrode; a resilient mounting member having a base plate and a plurality of extensions on said base plate equidistant from a point on said base plate for the insertion of one end of said cylindrical device between said extensions, said extensions extending downwardly and inwardly; a second resilient mounting member having a split base and a half-round superstructure connecting the portions of said base, a portion of the superstructure having an inside diameter equal to that of the cylindrical device; and means to clamp the second end of the cylindrical device to said portion of the superstructure.

13. A cylindrical capacitor to be inserted within a container of fluid comprising: a cylindrical capacitor member shaped to be positioned within a container of fluid; a resilient mounting member having a base plate and means extending therefrom and defining an opening of approximately the same diameter as that of said capacitor member for the insertion of one end of said capacitor member in said opening, said resilient member being shaped to bear against one of the inner walls of the container; a second resilient mounting member having a base structure and means extending therefrom to define a partial cylinder having an inside diameter equal to that of said cylindrical capacitor member, said second resilient member being shaped to bear against the wall opposite to that against which said first resilient member bears; and means to secure the second end of said cylindrical capacitor member to said partial cylinder means of said second resilient mounting member.

14. A mounting for a cylindrical device having drainage holes in and around the bottom comprising: a resilient member having a base plate and a plurality of extensions on said base plate equidistant from a point on said base plate for engaging the wall of a cylindrical device adjacent the top end thereof so as to firmly retain the same; a second resilient member for supporting the bottom end of the device and having a split base and a half round superstructure connecting the portions of said base, a portion of said superstructure having an inside diameter greater than the diameter of the cylindrical device mounted in the mount to permit drainage of liquid through the holes around the bottom of the device and a further portion of the superstructure having an inside diameter equal to that of the cylindrical device; and means to clamp the cylindrical device to said further portion of the superstructure.

15. A mounting for a cylindrical device having a first and second end and holes in and around the second end thereof comprising: a resilient member having a base plate and a plurality of extensions on said base plate equidistant from a point on said base plate for engaging the wall of a cylindrical device adjacent the first end thereof so as to firmly retain the same; a second resilient member for supporting the second end of the device and having a split base and a half round superstructure connecting the portions of said base, a portion of said superstructure having an inside diameter greater than the diameter of the cylindrical device mounted in the mount to permit passage of fluid through the holes around the second end of the device and a further portion of the superstructure having an inside diameter equal to that of the cylindrical device; and means to clamp the cylindrical device to said further portion of the superstructure.

EARL C. BOWAR.

REFERENCES CITED

The following references are of record in the file of this patent:

UNITED STATES PATENTS

| Number | Name | Date |
|---|---|---|
| 1,030,402 | Slater | June 25, 1912 |
| 1,065,334 | Bailie | June 24, 1913 |
| 1,870,141 | Regerbis | Aug. 2, 1932 |
| 2,356,593 | Koeppe | Aug. 22, 1944 |
| 2,375,084 | Coroniti | May 1, 1945 |
| 2,451,125 | Sporing | Oct. 12, 1948 |

FOREIGN PATENTS

| Number | Country | Date |
|---|---|---|
| 802,699 | France | Sept. 10, 1936 |